United States Patent [19]

Boenke et al.

[11] Patent Number: 5,636,337
[45] Date of Patent: Jun. 3, 1997

[54] METHOD AND SYSTEM FOR COLOR FILM SEPARATION PREPROCESS USING ELECTRONIC OBJECT-BASED CHOKING AND SPREADING PROCEDURES INCLUDING OBJECT COMBINING OPERATIONS

[75] Inventors: Mark Boenke, Santa Rosa; Derek Clegg, San Francisco; Mike Gittelsohn, Berkeley; Keith Passaretti, San Rafael; Audrey Seymour, Mill Valley, all of Calif.

[73] Assignee: Island Graphics Corporation, Larkspur, Calif.

[21] Appl. No.: 411,378

[22] Filed: Mar. 27, 1995

Related U.S. Application Data

[63] Continuation of Ser. No. 747,783, Aug. 20, 1991, Pat. No. 5,402,530.
[51] Int. Cl.$^6$ .................................................. G06F 15/00
[52] U.S. Cl. .................................................... 395/135
[58] Field of Search .................................. 395/133, 134, 395/135; 345/113, 114

[56] References Cited

U.S. PATENT DOCUMENTS

| | | | |
|---|---|---|---|
| 4,805,117 | 2/1989 | Fiore et al. | 364/518 |
| 4,809,065 | 2/1989 | Harris et al. | 358/88 |
| 5,115,479 | 5/1992 | Mutayama | 382/56 |
| 5,134,688 | 7/1992 | Corthout | 364/518 |
| 5,140,674 | 8/1992 | Anderson et al. | 395/111 |
| 5,159,669 | 10/1992 | Trigg et al. | 395/159 |
| 5,268,992 | 12/1993 | Sasaki | 395/110 |
| 5,295,236 | 3/1994 | Bjorge et al. | 395/134 |

OTHER PUBLICATIONS

Weiler, K., "Polygon Comparison Using a Graph Representation," ACM Siggraph Annual Conference Proceedings, publ. by Association for Computing Machinery (ACM), pp. 10–18, (1980).

Roth, S., "SettingTRAPS: Finding solutions to printing unexpected white gaps between abutting colors," *MACWORLD*, pp. 159–161. (May 1991).

*Primary Examiner*—Phu K. Nguyen
*Attorney, Agent, or Firm*—Townsend and Townsend and Crew LLP

[57] ABSTRACT

A computer system 100 for production of ink separations from an object-based print pre-process apparatus using a page description language. The print pre-process system facilitates creation of object spreads for any combination or configuration of objects on the rendered page. For each object on a rendered page, the computer system 100 makes use of a spread table to determine spread incidences. For each spread incidence, the computer system generates set union, intersection and difference for spreading, receiving, and obstructing objects by use of a modified Weiler algorithm. The modified Weiler algorithm creates a simplified graph of contour histories providing a visible portion of the spread object. The visible object is strokable within a clipped window set to the receiving object. The stroke color and width, set by the spread table, can be knockout print or overprint.

21 Claims, 13 Drawing Sheets

Microfiche Appendix Included
(3 Microfiche, 278 Pages)

5,636,337

METHOD AND SYSTEM FOR COLOR FILM SEPARATION PREPROCESS USING ELECTRONIC OBJECT-BASED CHOKING AND SPREADING PROCEDURES INCLUDING OBJECT COMBINING OPERATIONS

This is a continuation of application Ser. No. 07/747,783 filed Aug. 20, 1991 now U.S. Pat. No. 5,402,530.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but, otherwise, reserves all copyright rights whatsoever.

MICROFICHE APPENDIX

This specification includes microfiche Appendix I having 3 sheets with 278 frames, hereby expressly incorporated by reference for all purposes.

BACKGROUND OF THE INVENTION

The present invention relates generally to apparatus and methods for reducing print misregistrations in color printing, and, more specifically, to object-based choking and spreading procedures that include object combining operations for generation of color film separations.

Printing is well known. To print in color, a printing machine combines a plurality of color images from each of a plurality of platens. Each platen reproduces a portion of a final combined image from a plate pressed onto a recording medium. Photographic procedures create each plate from a film. A film for each plate typically corresponds to one primary color, with a set of films referred to as a set of film separations. FIG. 4 is an illustration of a set of film separations using cyan, magenta, yellow and black primary colors. The separations produce a plurality of plates for a printing machine. By varying particular color amounts contributed by each film separation to a final combined image, a large variety of colors for the combined image is possible. FIG. 5 is a schematic representation of one example of a printing press for color images. The printing press includes multiple platens, one for each separation layer as identified in FIG. 4, for example. Each roller adds its respective color, as identified by its plate created from its corresponding film, to a recording medium passing beneath the platen. Each subsequent platen contributes its color to the recording medium until all platens have contributed their respective colors to the final image. Each color's contribution to any particular part of the final image is variable from zero percent to one hundred percent.

The method requires precise synchronization and alignment of the platens to each other and to the advancing recording medium. Any positional or timing error in laying down the individual patterns of each color separation results in improper alignment of the various images. The printing industry refers to this improper alignment as print misregistration.

FIG. 6A is an illustration of a desired registration of a black text character "a" on a cyan background. If there is some error in recording of either the character "a" or the background, misregistration results. FIG. 6B is an illustration of a misregistration of the character "a" on its cyan background. The misregistration is particularly noticeable in that the misregistration exposes portions of the recording medium which were not inked. The fact that each color of the FIG. 6B image is a single ink (contribution from a single platen) makes misregistration more likely. To avoid this problem, printers long ago developed photographic techniques called choking and spreading to make misregistration less noticeable. Choking and spreading refers to controlling the images of the film separations to compensate for misregistration. Rather than requiring exact alignment of the respective images of the film separations, the film separation allows overlap of the various colors. Thereafter, small misalignments are not as noticeable.

Typically, in spreading and choking, the lighter color overlaps the darker color. Printers perceived that a dark area with a lighter color mixed in was less noticeable than either a white border around mismatched images, or darker colors in lighter images. Thus, a region bordering images of different colors which abut one another is actually made a third color.

Spreading refers to enlarging an object on top of its background, while choking refers to enlarging a background to overlap the object. These photographic techniques include actual enlargement of the subject image.

Pre-press processing systems generate the film separations for use in color printing. It is known to use computer-assisted, pre-press systems to facilitate generating film separations. The computer-assisted, pre-press systems electronically store the various object and background images. A pre-press system operator can electronically manipulate the various images to choke or spread a desired image onto another object. These pre-press systems typically store a page as a large rasterized image having an array of pixels. The rasterized image associates each pixel with four color bytes. Typical pixel densities range from about 50 dots per inch (DPI) to about 2000 DPI, with 300 DPI common. Thus, representing an ordinary notebook size page of 8.5"×11" requires over 32 million bytes at a resolution of 300 DPI with four color bytes per pixel. Special encoding reduces the size of the raster, but as the number of pages increases, the total memory requirements become unwieldy. Image storage is a disadvantage with these systems. Spreading and choking is relatively easy with rasterized images because the system knows each image's pixel value and position. Changing particular images is straightforward.

Another disadvantage of the rasterized approach relates to editing and changing the images. Unless an unlimited amount of image storage capability is available, spreading with rasterized images is a one-way process. Reversing one or more spread steps is difficult unless the operator stores each intermediate result prior to executing a subsequent spreading step. For example, if a customer desires to change a font in a headline, the operator typically performs all the spreading, choking and editing operations again from a rasterized image with the new font.

Current page layout and illustration products, including QuarkXPress (available from Quark, Incorporated), Aldus Freehand (available from Aldus Corporation), and Adobe Illustrator (available from Adobe Systems Incorporated) for the Macintosh provide functionality to choke and spread ink separations in limited situations. These systems offer an advantage over prior art raster systems memory storage and editing limitations because they are object-based systems. The information stored to recreate a page is less than with the raster system, saving disk storage space. Additionally, the user can re-edit jobs without starting from an initial drawing and recreating all the chokes, spreads and other operations anew. The object-based systems output results in a page description language rather than as encoded rasters. Prior art systems have limited choking and spreading functionality dependent upon a particular page description language the system employs.

Object-based systems use a page description language to define objects on a rendered page of a display medium, such as a video display terminal (VDT) or a printed page. The page description language defines each object with a path which traces its outline. Rendering is the process of either filling a path with a fill color, stroking a path with a stroke color, or flowing text within an object's path.

"PostScript" is a commonly used page description language. Adobe Systems, Inc. created and promulgates the PostScript language. PostScript functionality and definitions are defined in "PostScript Language Reference Manual" Addison-Wesley Publishing Co., Inc., 1985, hereby incorporated by reference for all purposes.

Existing systems typically depend upon four page-description-language-related features to perform spreading and choking. These four operations include fill (and eofill), stroke, overprint and clip (and eoclip). The fill operator paints an interior of an object a specified color. The stroke operator produces a variable width line of specified color centered on a stroked object's outline. The overprint operator is used to generate ink separations. Overprint allows addition of color to selected separations when drawing an object without altering other separations. The alternative is knockout printing, which automatically overwrites all non-painted separations with white. The clip operator limits an extent of a rendering region on a page.

A simple prior art solution to spreading is to render a stroke of a spreading object using overprint to overlap a particular color into an abutting color. Unless the spreading object lies completely within the interior of the choked object, this method will produce distorted spread objects as the spread object will extend into inappropriate areas. A next level of spreading complexity uses the clipping operator to limit all renderings to an area lying within the object receiving the spread. Subsequent stroke overprinting only appears within an area of overlap, that is, where the stroked object falls within the object receiving the spread.

This improved prior art spreading mechanism has limitations in at least four situations. A user faced with one of these situations must either alter the design, or employ the raster-type system.

1. A user cannot stroke an object and subsequently spread the stroke into an abutting object's fill or stroke. Only an object's fill can spread into another object's fill. Current page description languages do not permit a stroke to follow the outline of the stroke of an object.

2. Obstructors, additional objects lying on top of the spreading object, prevent Spreading because the outline of the spreading object no longer defines the boundary to be spread across.

3. Some page description languages do not have an overprint feature, preventing formation of overlapping colors from different objects.

4. Even if none of the previous three limitations are present, the prior art method will provide an incorrect result in certain cases when the spreading object lies under receiving object. If one or more edges of the spreading object lie exactly under edges of the receiving object, then stroking either the spreading object or the receiving object produces the wrong result. This is because where their outlines overlap, neither outline separates the two colors, but rather borders the background.

SUMMARY OF THE INVENTION

The present invention provides a method and apparatus for spreading one object into a second abutting or overlapping object without the limitations of the prior art. The present invention offers the extensions needed to spread any object into any object.

One preferred embodiment of the present invention defines all objects with a page-description-language path and three zones. The zones include a fill zone, a border zone, and a text zone. A system employing the present invention incorporates a rendering or display order for these three zones in each object. The zones progress from the fill zone (lowest zone), to the border zone (intermediate zone), and finally to the text zone (highest zone).

For any combination of objects having one or more of the zones, the present invention calculates the outline of the spreading boundary for the set of objects. Set operations of union, intersection and difference for the overlapping objects define a new object. The new object is the visible portion of the spreading object whose outline contains the spreading boundary. This outline of the visible spreading object is strokable. To perform a spread, the system limits the page to an interior of an object receiving the spread. A subsequent stroking of the visible spreading object's outline with a knockout color of a user's choice spreads the desired object into the receiving object. The knockout color permits control over the blending of the spreading and receiving objects' color that is better in some instances than the automatic blending of overprinting. The user could use overprinting, if desired.

DESCRIPTION OF A PREFERRED EMBODIMENT

Figure 1:
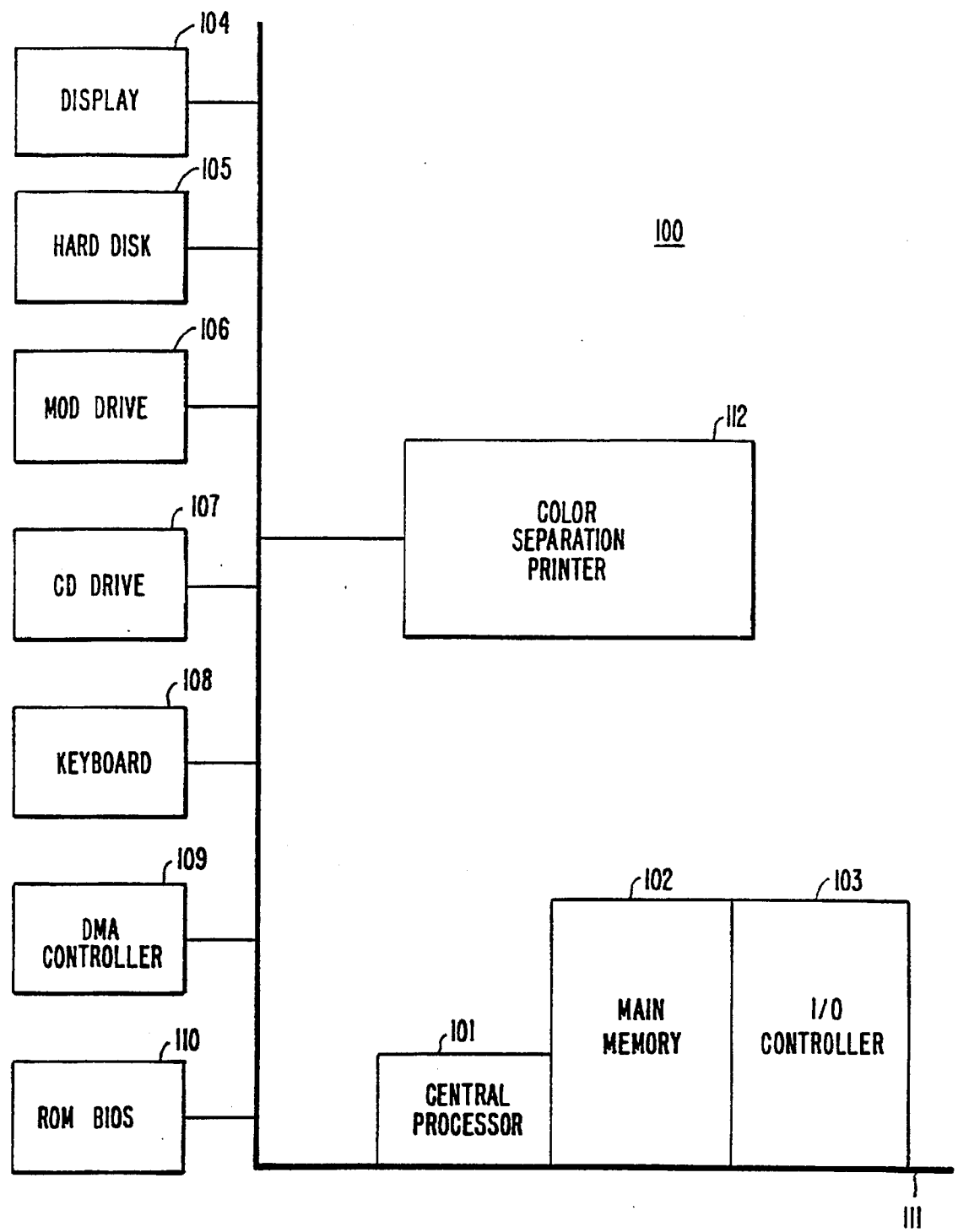
FIG. 1 is a block diagram of one example of a computer system 100 in which the present invention may be embodied.

FIG. 1 is a block diagram of one example of a computer system 100 in which the present invention may be embodied. The computer system 100 includes a central processor 101, a main memory 102, an input/output (I/O) controller 103, a display monitor 104, a fixed disk (hard disk) 105, a magnetic optical disk (MOD) drive 106, a compact disk (CD) drive 107, keyboard 108, direct memory access (DMA) controller 109, and read-only memory (ROM) 110. A system bus 111, or similar structure, allows these components to exchange information with each other and with a color separation printer 112. The color separation printer 112 may be any of well-known prior art devices which generate color film separations from appropriate information supplied by the computer system 100.

In operation, a user enters commands or data through the keyboard 108 or other input/output device, such as a mouse. The computer system 100 outputs information on the display 104 or the color separation printer 112. In one preferred embodiment, the present invention employs an appropriately programmed Macintosh personal computer (Apple Computers, Inc.).

While description of the preferred embodiment proceeds by reference to a particular computer system 100, different embodiments employ a wide variety of computer systems. The present invention is an interactive computer system which either generates or imports a plurality of graphic objects defined by a page description language, such as PostScript, into its main memory 102. The plurality of objects define a printed color page. It is desirable to minimize print misregistration when a printer actually prints the page using a set of ink separations produced by the color separation printer 112. A preprocess operator selects one of the objects for spreading. The user operates the mouse to identify a particular object for spreading. The computer system 100 prompts the user for information to complete a spreading table for the selected object. The spreading table associated with each object includes information regarding a spreading zone, a spreading zone color, a receiving zone, a receiving zone color, a spread color, and a spread amount.

Figure 2:
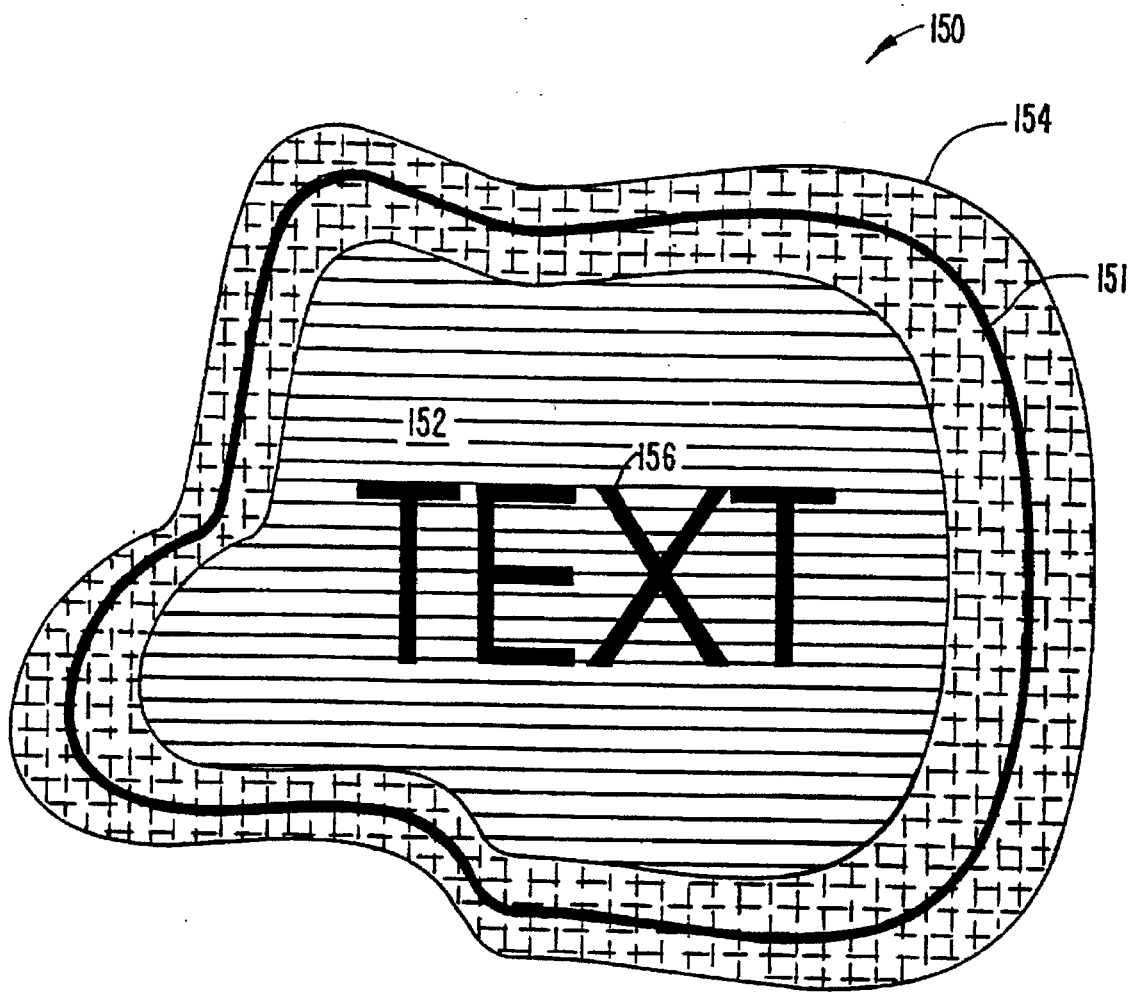
FIG. 2 is an illustration of one example of an object 150 rendered on the display 104.

FIG. 2 is an illustration of one example of an object 150 rendered on the display 104. The object 150 has an outline 151 which identifies a closed path. As is well known, any closed path has an interior determined by an "insideness rule", such as a winding-number rule or an even-odd rule. The object 150 has a lowermost zone referred to as a fill zone 152. One attribute of the object 150 is that it includes a particular fill color for the fill zone 152. A border 154 results from stroking the outline 151 with a stroke color having a stroke width. Stroking the outline 151 results in centering the border 154 on the outline 151. The border is rendered on top of the fill zone 152. The object 150 can have text 156 flowed over the fill zone 152. The text 156 includes an associated color and is in the uppermost zone of the particular object. The preferred embodiment treats the fill 152, the border 154, and the text 156 as different zones of the object 150. The preferred embodiment considers each zone of each object to be a closed path. This permits the object 150 to have its border 154 spread against its fill 152 (and vice versa). Converting each border 154 zone and each text 156 zone into a closed path allows identical treatment for all the zones.

Figure 3:
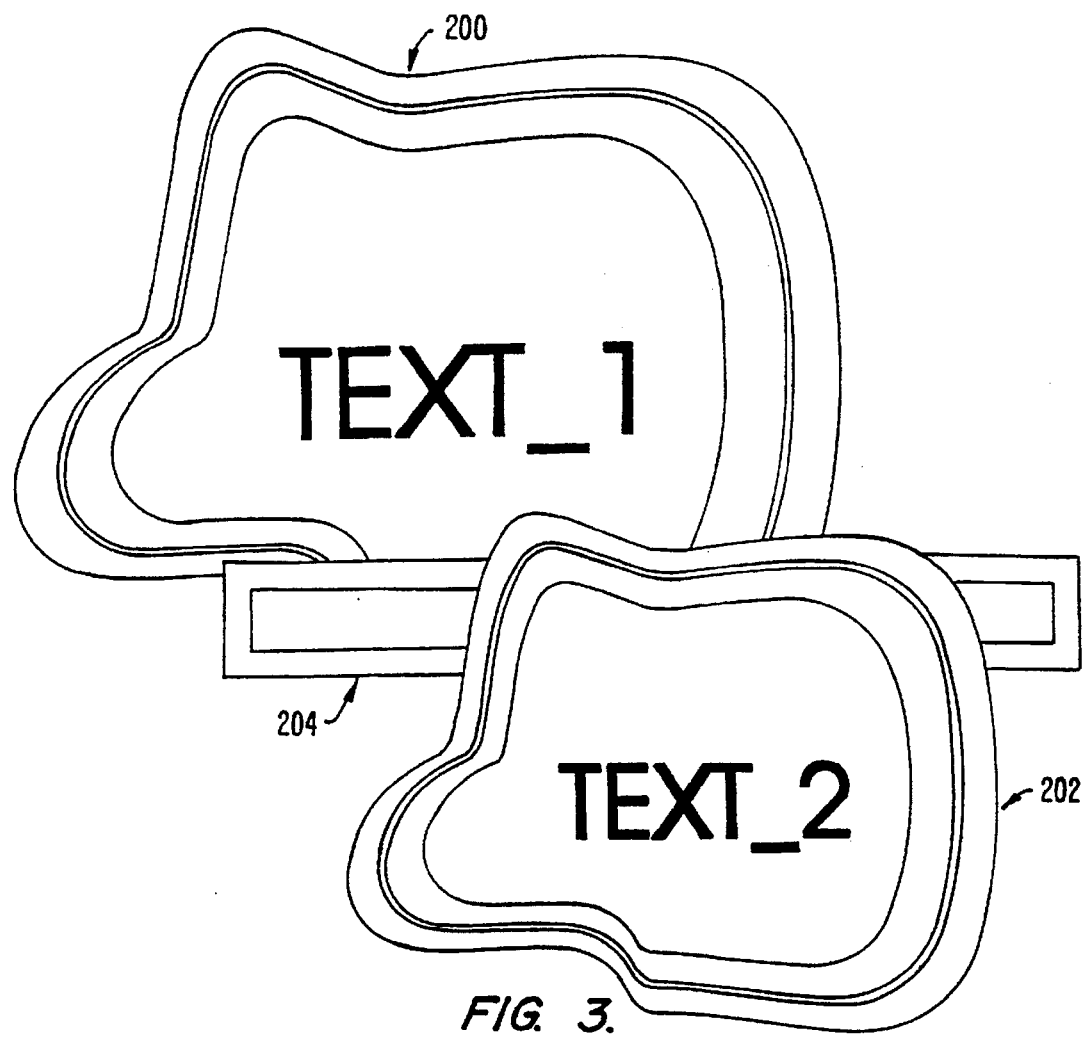
FIG. 3 is an illustration of a possible spreading incidence in which a lighter colored first object 200 has an overlying darker colored second object 202.
Figure 4:
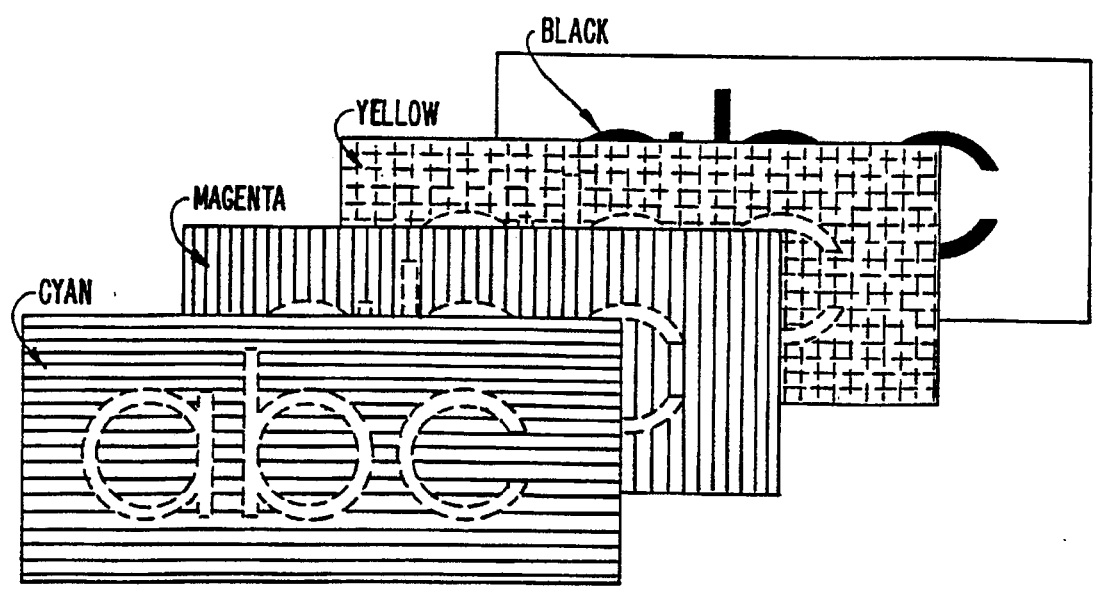
FIG. 4 is an illustration of a set of film separations using cyan, magenta, yellow and black primary colors.
Figure 5:
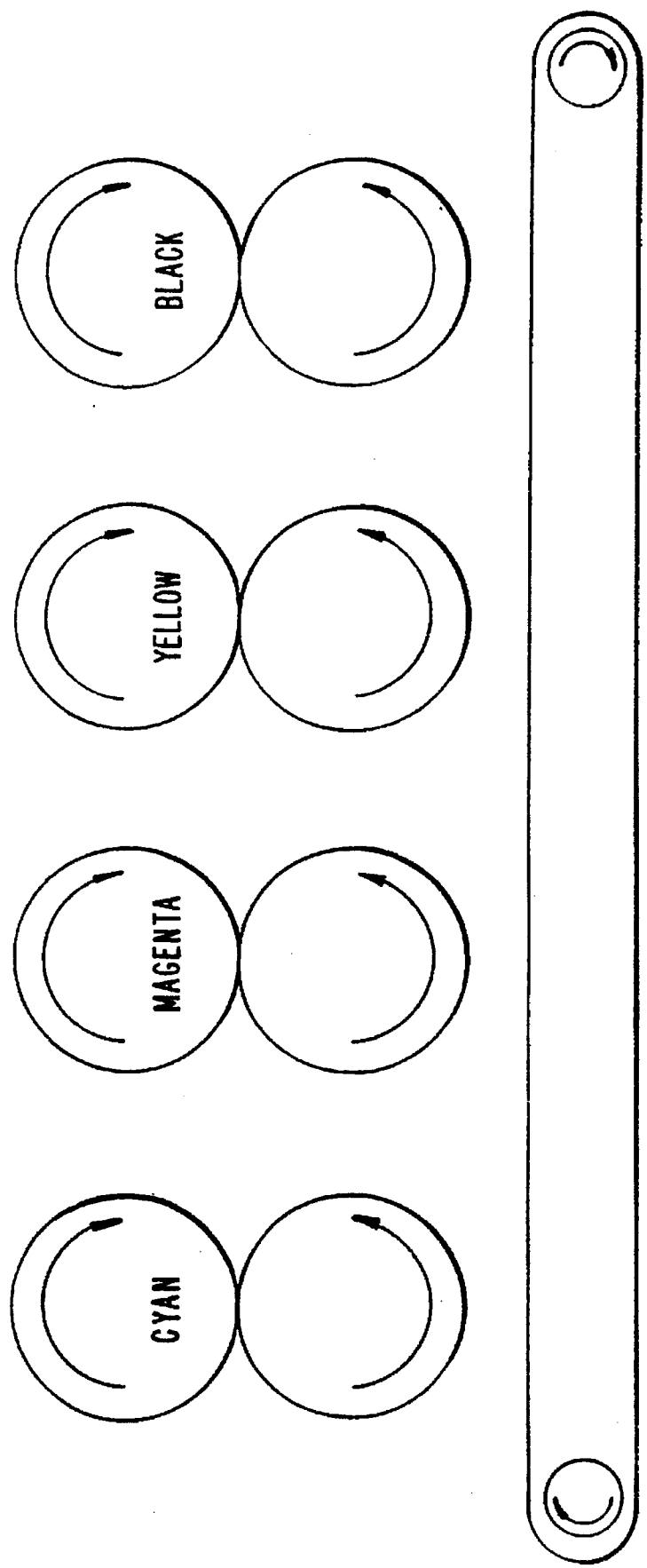
FIG. 5 is a schematic representation of one example of a printing press for color images.
Figure 6A:
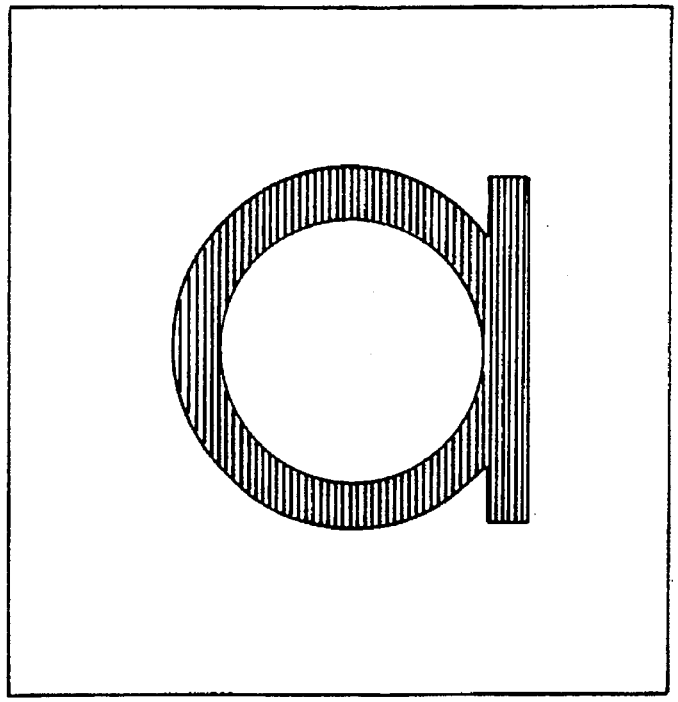
FIG. 6A is an illustration of a desired registration of a black text character "a" on a cyan background.
Figure 6B:
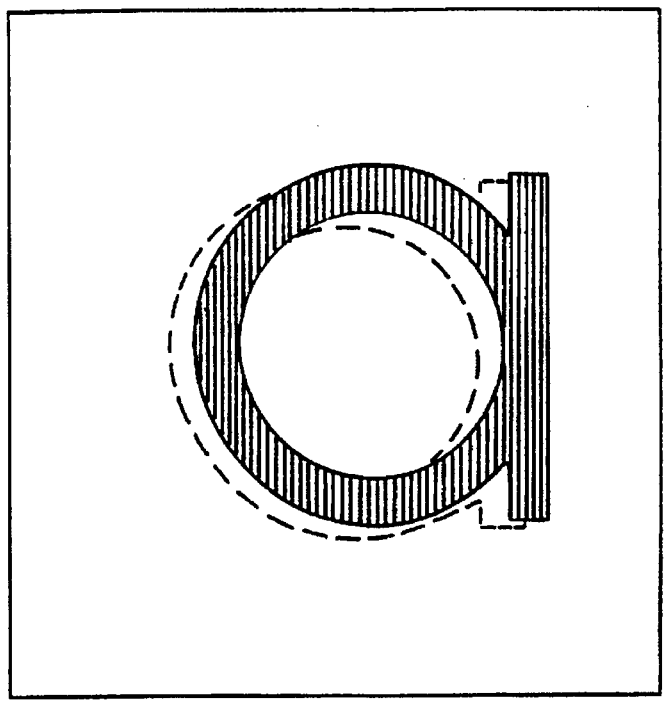
FIG. 6B is an illustration of a misregistration of the character "a" on its cyan background.

FIG. 3 is an illustration of a possible spreading incidence in which a lighter colored first object 200 has an overlying darker colored second object 202. An obstructor 204 lies between the first object 200 and the second object 202. The obstructor 204 represents any object lying between the first object 200 and the second object 202. For purposes of the following description, the first object 200 has a fill color of yellow, and a border color of 75% yellow and 25% magenta. The second object 202 has a border color of 100% cyan, and a fill color of 50% magenta and 50% cyan. Text of the first object 200 and the second object 202 is 100% black. The obstructor 204 has a 100% black border over a white fill. Other color combinations are possible, and no limitation of the present invention is intended by the particular choice of the illustration of FIG. 3.

The user selects the first object 200 to make an entry in the first object's spreading table. An intersect zone is a zone in which a spread will actually occur and is equivalent to the receiving zone. The preferred embodiment paints all spreads which should appear over the intersect zone after it paints the intersect zone.

Table 1 is one example of a spreading table for the first object 200. The first object 200 intersects both the second object and the obstructor 204. To have the first object spread against all objects, except for those that are 100% black, the following entries are made.

TABLE 1

| # | Object Color | Receiving Color | Spread Color | Spread Amount |
|---|---|---|---|---|
| 1 | 100% Yellow (Fill) | ANY | 100% Cyan | 0.1 |
| 2 | 75% Yellow 25% Magenta (Border) | ANY | 100% Cyan | 0.1 |
| 3 | 100% Yellow (Fill) | 100% Black | N/A | 0.0 |
| 4 | 75% Yellow 25% Magenta (Border) | 100% Black | N/A | 0.0 |
| n | ... | ... | ... | ... |

Spread amount is measured in inches in the preferred embodiment.

After painting the obstructor object 204, the preferred embodiment checks all the objects (the first object 200, the second object 202, and the obstructor 204) to see if they should spread against the obstructor 204. As the first object 200 is the only object having a defined spread table in this example, it is the only object which can spread. The first object 200's spread table is checked backward from a last entry to a first entry. Entries #4 and #3 indicate that when either the fill or the border of the first object 200 abuts the obstructor object 204, it spreads by 0 inches. Therefore, no object spreads onto the obstructor 204.

After painting the second object 202, the preferred embodiment checks all the objects (the first object 200, the second object 202, and the obstructor 204) to see if they should spread against the second object 202. Checking the first object 200's spread table again produces entries #2 and #1 to control the spreading. As the receiving color of entries #2 and #1 is ANY, both the border and the fill of the first object 200 spread into the second object 202. The first object spreads 0.1 inch of 100% cyan into the border of the second object.

The following series of steps describes how to render any particular object having spreads. For each receiving zone, in this case the border of the second object 202, the computer system 100 paints the receiving zone. For each zone to spread into the receiving zone, that is the fill and the border of the first object 200, the preferred embodiment clips to the spreading zone to provide an initial temporary object. Subtracting or clipping out all obstructors (the obstructor 204) and any croppers of the spreading object from the initial temporary object creates a final temporary object which is the visible or exposed portion of the spreading zone. A subsequent stroke of the final temporary object constructed from each spreading zone, using the spread color and spread width from the spread table, results in spreading the first object 200's fill and border into the second object 202 and not into the obstructor 204. To complete the process, the preferred embodiment deletes the temporary object.

The set of steps described above can be implemented in many different ways in many different systems. FIG. 7 through FIG. 14 are a set of flowcharts detailing implementation of the preferred embodiment in the source code module included in Appendix I. The section of the C compiler code included in the Appendix identifies a series of steps under the heading "VE_render.c".

Figure 7:
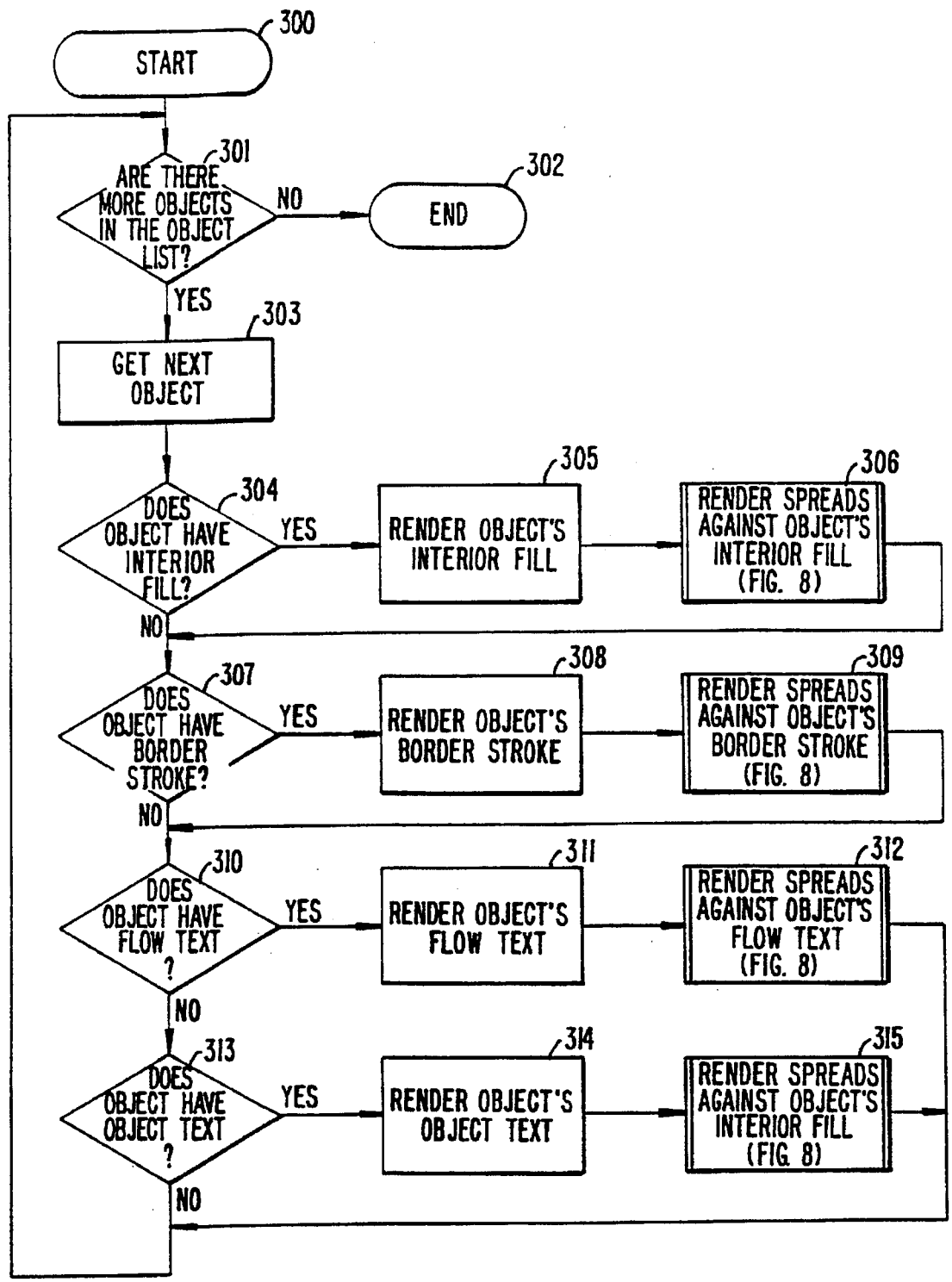
FIG. 7 is a flowchart illustrating operation of a topmost calling routine, identified as "VeRenderPrim", of the source code of Appendix I.

FIG. 7 is a flowchart illustrating operation of a topmost calling routine, identified as "VeRenderPrim", of the source code of Appendix I. The VeRenderPrim routine, for each object, renders all the zones of the object with any received spreading against each zone. In the code, a "prim" data structure represents objects. "Spread_prim" identifies the spreading object, and "intersect_prim" identifies the receiving object.

The VeRenderPrim routine begins at step 300. The routine includes an object list of all objects the computer system 100 (FIG. 1) is to render. Step 301 checks the computer 100's rendering of the objects by using the object list to determine if any object is unrendered. Rendering every object's zones and rendering any spreads against the zones completes the routine at step 302. However, at step 303, if any objects remain in the object list, the routine gets the next object. If the object has an interior fill, the routine first renders the object's interior fill, step 305, and then renders spreads against the object's interior fill at step 306.

After completing the step 306, or the step 304 if the object did not have an interior fill, the routine next checks for a border stroke at step 307. If the object has a border stroke, the routine first renders the object's border stroke, step 308, and then renders spreads against the object's border stroke at step 309.

After completing the step 309, or the step 307 if the object did not include a border stroke, the routine next checks for flow text in the object at step 310. If the object has flow text, the routine first renders the object's flow text, step 311, and then renders spreads against the object's flow text at step 312.

After completing the step 312, or the step 310 if the object did not have flow text, the routine next checks for object text at step 313. If the object has object text, the routine first renders the object's object text, step 314, and then renders spreads against the object's object text at step 315.

After completing the step 315, or the step 313 if the object did not have flow text, the routine returns to the step 301 to check for more objects. The process continues until the object list is empty.

Figure 8:
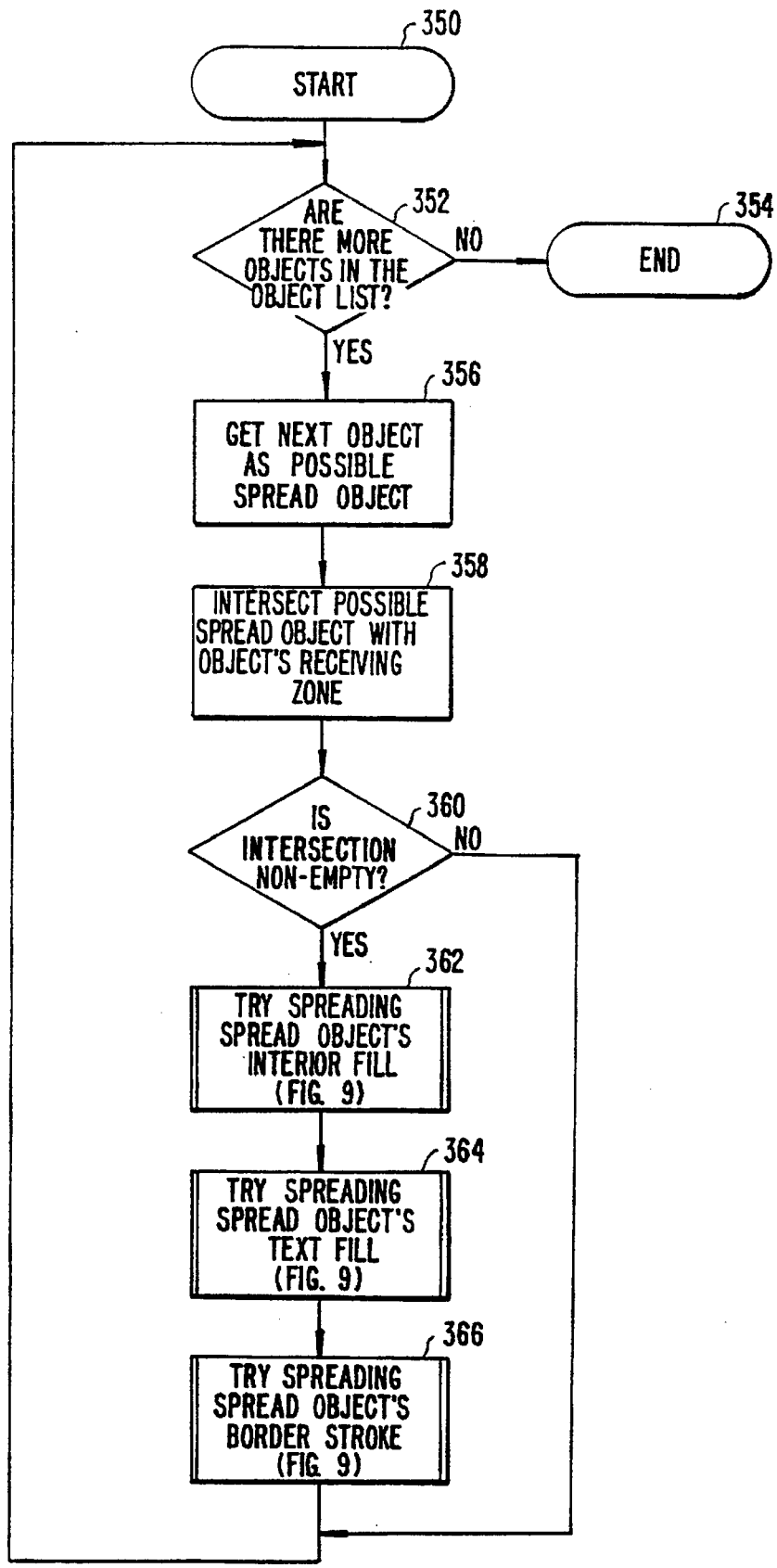
FIG. 8 is a flowchart illustrating operation of a routine, called by VeRenderPrim and identified as "RenderSpreadAgain" of the source code of Appendix I.

FIG. 8 is a flowchart illustrating operation of a routine, called by VeRenderPrim and identified as "RenderSpreadAgainst", of the source code of Appendix I. The RenderSpreadAgainst routine includes a set of steps called by the steps 306, 309, 312 and 315 of FIG. 7. The RenderSpreadAgainst routine includes a subroutine identified as "ApplySpreadsToPrimsOnDl" that is applied to the entire object list. The ApplySpreadsToPrimsOnD1 routine includes "prim_intersect_spread_func" which provides preliminary testing for possible spread cases.

Calling the RenderSpreadsAgainst routine executes step 350 through step 366. After starting at step 350, the routine checks an object list for more objects at step 352. If no more objects are in the object list, at step 354 the routine returns to the calling routine. One or more objects remaining in the object list at step 352 results in the routine getting a next object as a possible spread object at step 356. At step 358, the routine intersects the possible spread object with the object's receiving zone. Step 360 checks the intersection to determine if the intersection is non-empty. An empty intersection causes the routine to return to the step 352 to check for more objects in the object list.

A non-empty intersection at the step 360 causes the routine to try spreading the spread object's different zones successively. Step 362 tries to spread the spread object's interior fill. Step 364 tries to spread the spread object's text fill. Step 366 tries to spread the spread object's border stroke. After trying each of the spreads, the routine returns to the step 352 to check for more objects in the object list.

Figure 9:
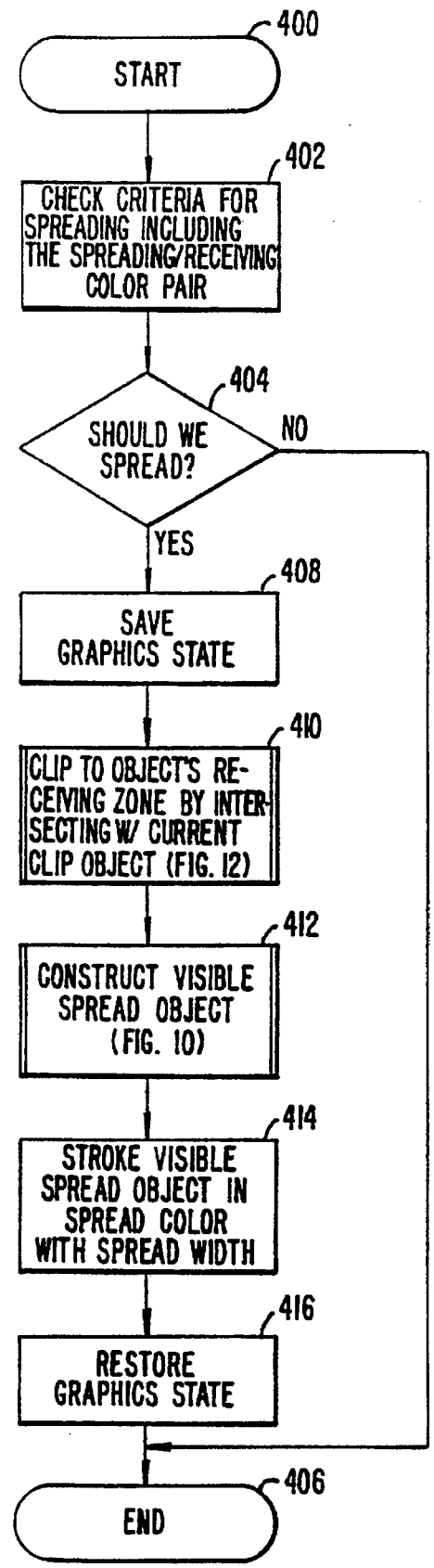
FIG. 9 is a flowchart illustrating operation of a routine, called by RenderSpreadAgainst via routines "ApplySpreadstoPrimsonDl" and "prim_intersect_spread_func", and identified as "TrySpeading", of the source code of Appendix I.

FIG. 9 is a flowchart illustrating operation of a routine, called by RenderSpreadAgainst and identified as "TrySpreading", of the source code of Appendix I. The TrySpreading routine includes a set of steps called by the steps 362, 364 and 366 of FIG. 8. The TrySpreading routine includes a subroutine identified as "ShouldSpreadAgainst" that determines if a spread zone should spread against a receiving zone. This subroutine searches the spread object's spread table backwards for an entry which matches the parameters of the spread zone and the receiving zone. Searching in a preferred direction, that is, backwards in the preferred embodiment, is required as multiple entries in the spread object's spread table may match the particular parameters.

Calling the TrySpreading routine executes step 400 through step 406. After starting at step 400, the routine checks criteria for spreading at step 402. The check includes comparison of a particular spreading/receiving color pair as identified in the spread table. Step 404 determines a result of the check, executed by the routine ShouldSpreadAgainst. If no spreading should occur, the routine branches to step 406, end, and returns to the routine calling TrySpreading.

If a spread incidence exists, the routine branches from the step 404 to save the present resident graphics state. The preferred embodiment makes use of various clipping mechanisms in a short term fashion to obtain a desired spreading result. Therefore, by saving the resident graphics state prior to clipping, the preferred embodiment is able to restore the graphics state when spreading is complete.

After saving the resident graphics state, the TrySpreading routine clips to the receiving zone by intersection of the current clip object with the receiving zone at step 410. Subsequent to the step 410, the routine constructs the visible spread object at step 412. The step 412 is a complex step implemented with a call to a "SetClippedPrimPath" routine. The step 412 subtracts any intervening and obstructing objects from the spread object. The step 410 also calls the SetClippedPrimPath to set the receiving object (intersect__prim) to become the clip object. However, in the step 410 call, the routine sets a flag to prevent obstructors from being subtracted. The SetClippedPrimPath routine passes the flag down to a routine identified as "PunchOutPrim." PunchOutPrim uses two routines, "GPSeoclip" and "GPSeoclipout" to perform actual subtraction. The GPS section of the code in Appendix I includes the GPSeoclip and GPSeoclipout routines.

After constructing the visible spread object at step 412, the preferred embodiment strokes the visible spread object with spread color having spread width. The visible spread object is a temporary path deleted when step 416 restores the stored graphics state after the step 414 stroking. Upon restoring the graphics state, the preferred embodiment returns to the routine calling TrySpreading by advancing to step 406.

Figure 10:
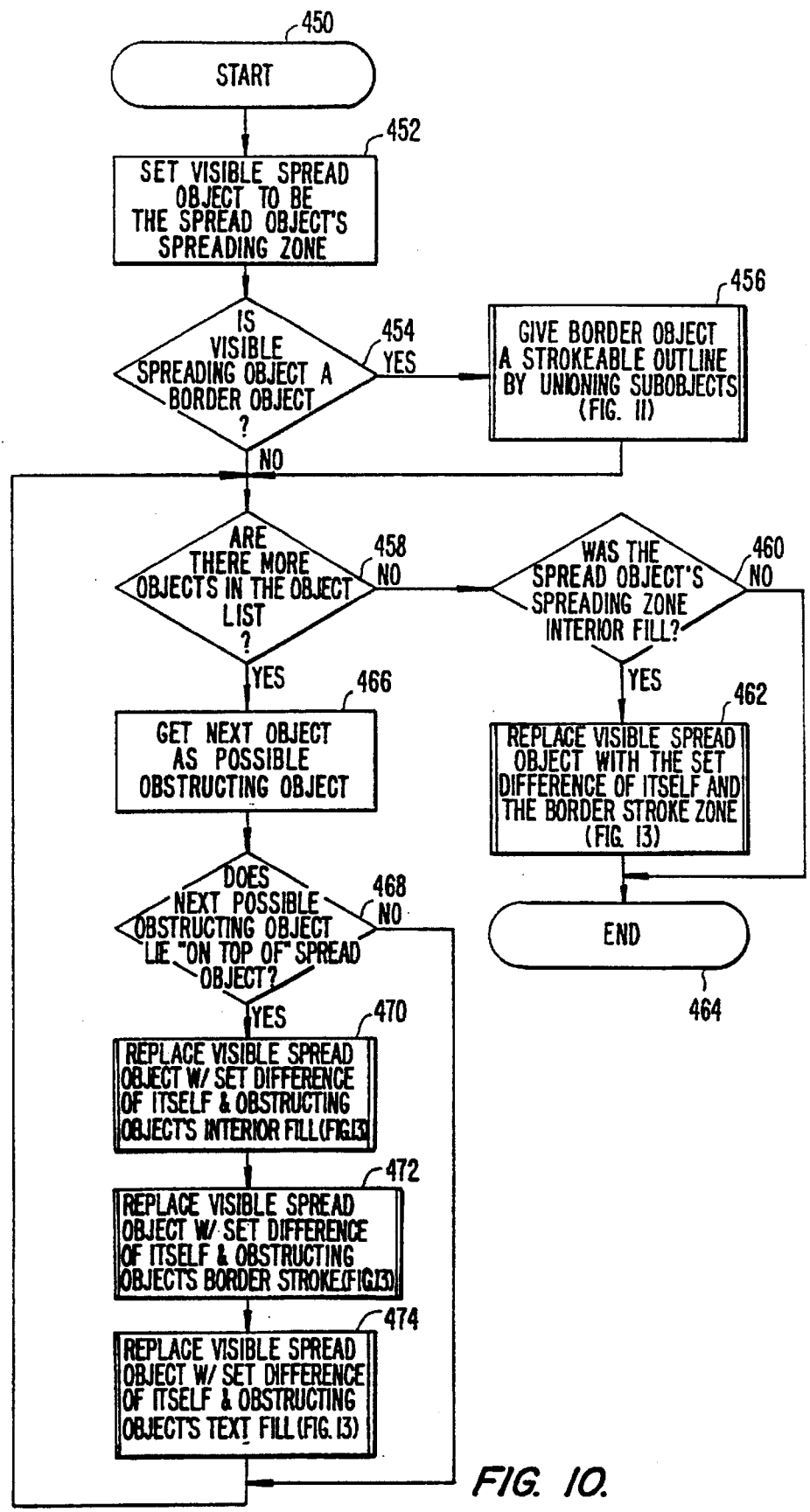
FIG. 10 is a flowchart illustrating operation of a routine, called by TrySpreading and identified as "SetClippedPrimPath", of the source code of Appendix I.

FIG. 10 is a flowchart illustrating operation of a routine, called by TrySpreading and identified as SetClippedPrimPath, of the source code of Appendix I. The SetClippedPrimPath routine includes a set of steps called by the steps 410 and 412 of FIG. 9.

Calling the SetClippedPrimPath routine executes step 450 through step 464. After starting at step 450, the routine sets a visible spread object equal to the spread object's spreading zone at step 452. If this initial visible spread object originated from a border zone, as tested in step 454, it is converted to an equivalent object with a strokeable outline by performing set union on the object's subobjects at step 456. This is implemented in the first stage of the PunchOutPrim routine identified in the discussion of FIG. 9. The called subroutine "PutPrimPath" calls the routine "GPSstrokeoutline", which calls the routine "GPS_path_algebra", which in turn calls the subroutines performing the self-union operation.

The PunchOutPrim routine performs its subtracting operations on each obstructing object; therefore it uses the object list. At step 458, the routine checks to determine if there are more objects in the object list. If there are no more objects, the routine determines if the spread object's spreading zone was an interior fill at step 460. Step 464, end, returns to the calling routine if the spread object's spreading zone was not interior fill. Otherwise, at step 462, the routine replaces the visible spread object with a set difference of itself and the border stroke zone. The GPSeoclip and GPSeoclipout routines identified in the discussion of FIG. 9 both call the routine "GPS_path_algebra", which in turn calls the subroutines which perform intersection and difference. After the replacement of the visible spread object at step 462, the routine advances to step 464 to return to the calling routine.

The union, intersection and difference subroutines result from novel extensions to a polygon comparison algorithm published by Kevin Weiler in Computer Graphics, Vol. 14, #3, Jul. 1980, pp. 10–18. The article's title is "Polygon comparison using a graph representation." The article is hereby expressly incorporated by reference for all purposes. Further description of the Weiler algorithm and the extensions will be made in reference to a description of FIG. 11 through FIG. 14.

If the object list check of step 458 had indicated additional objects were in the object list, the routine would get the next object as a possible obstructing object at step 466. Step 468 determines if the next possible obstructing object overlies the spread object. If the possible obstructing object does not overlie the spread object, the routine returns to step 458 to check for more possible obstructing objects.

However, if the possible obstructing object overlies the spread object, the routine replaces the visible spread object with a set difference of itself and the obstructing object's interior fill at step 470. After step 470, the routine replaces the visible spread object with a set difference of itself and the obstructing object's border stroke at step 472. After step 472, the routine replaces the visible object with a set difference of itself and the obstructing object's text fill at step 474. The routine thereafter returns to step 458 to determine if there possibly could be more obstructing objects.

Figure 11:
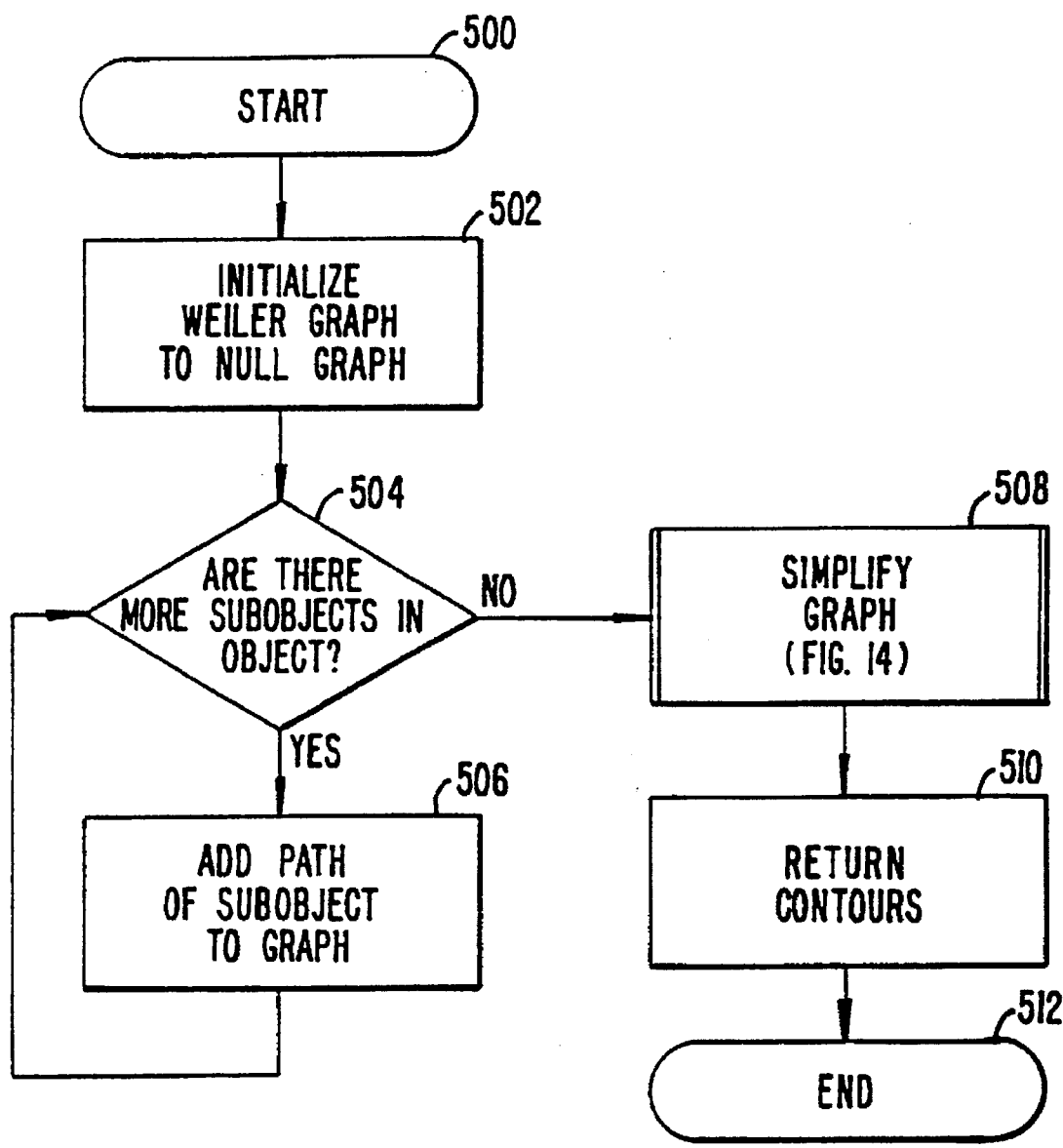
FIG. 11 is a flowchart illustrating operation of a routine, called by SetClippedPrimPath via "PunchOutPrim", "PutPrimPath" and "GPSstrokeoutline", and identified as "GPS_path_algebra" in self-union mode, of the source code of Appendix I.

FIG. 11 is a flowchart illustrating operation of a routine, called by SetClippedPrimPath via "PunchOutPrim", "PutPrimPath" and "GPSstrokeoutline", and identified as "GPS_path_algebra" in self-union mode, of the source code of Appendix I. This routine includes a set of steps called by the step 456 of FIG. 10.

Calling the GPS_path_algebra routine in self-union mode executes step 500 through step 512. After starting at step 500, the routine initializes a Weiler graph to a null graph at step 502. The Weiler algorithm generates a planar graph that is a combination of all polygons from a set of input polygons. The Weiler algorithm extracts an appropriate subset of the graph according to a particular specified object set operation. The preferred embodiment uses object paths defining objects that are able to include curved path segments. To apply the Weiler algorithm, the preferred embodiment polygonizes the paths before using the set operation subroutines.

Planar graphs comprise a collection of edges and vertices. The set of vertices in the graph is the collection of all the vertices in the input polygons, plus a vertex for each intersection of edges between the input polygons. The set of edges in the graph is the collection of all the edges from the input polygons, divided at any new vertices formed from edge intersections.

The Weiler algorithm maintains information for each edge as it creates the graph. The information indicates which input polygons were bounded by any particular edge. As the graph is planar, the graph divides the plane into non-intersecting regions, each of which is entirely contained within some of the input polygons. The Weiler algorithm also constructs a tree data structure indicating containment relationships between the regions. Subsequently, from the containment tree and information related to the edges bounding a particular region, the algorithm determines a subset of input polygons containing each particular region. The Weiler paper describes the regions as contours.

The preferred embodiment of the present invention implements a modified Weiler algorithm. The modification simplifies the planar graph after its construction. Details of implementation of the Weiler algorithm, as well as the modification thereto, are shown in the flowcharts and contained within the implementation of the C language of the Appendix I.

After initializing the Weiler graph at step 502, the routine checks to see if there are any more subobjects, or object subpaths, to be added to the graph at step 504. If there is another object subpath to add, the preferred embodiment uses a standard Weiler implementation to add the object subpath to the graph at step 506. Otherwise, the routine simplifies the graph in step 508. After simplification, the contours of the remaining graph correspond to the outline of the set union of all the subpaths of the starting object. These contours are then returned to the calling routine in step 510. Step 512 returns the routine to the calling routine.

Figure 12:
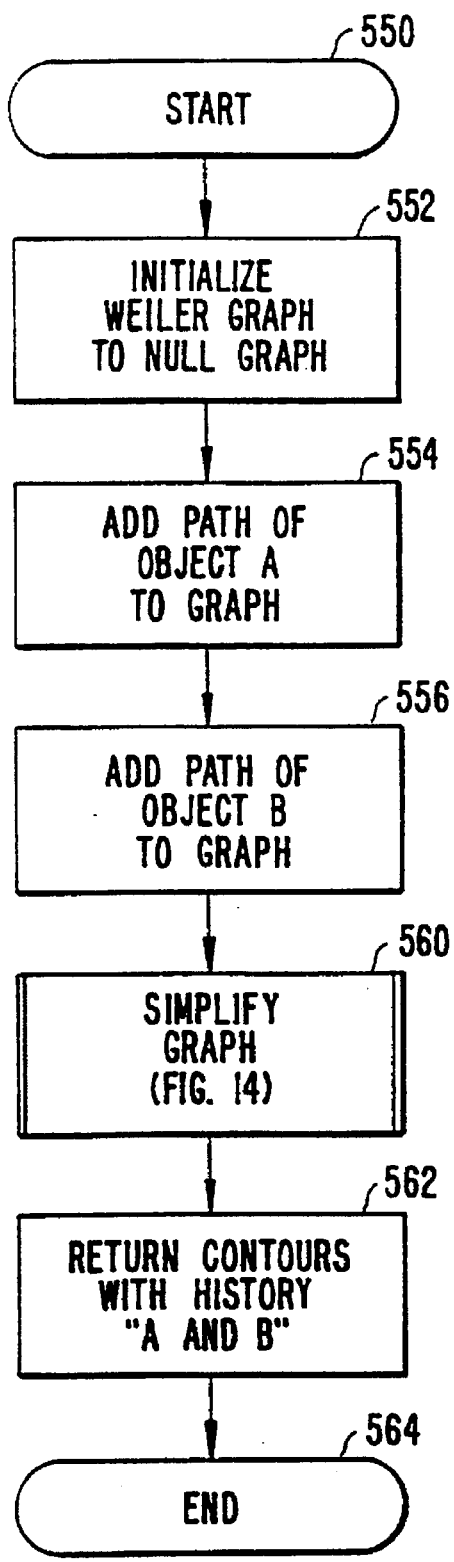
FIG. 12 is a flowchart illustrating operation of a routine, called by TrySpreading via "GPSclip" and identified as "GPS_path_algebra" in intersection mode, of the source code of Appendix I.

FIG. 12 is a flowchart illustrating operation of a routine, called by TrySpreading via GPSclip and identified as GPS_path_algebra in intersection mode, of the source code of Appendix I. This routine includes a set of steps called by the step 410 of FIG. 9.

Calling the GPS_path_algebra routine in intersection mode executes step 550 through step 564. After starting at step 550, the routine initializes a Weiler graph to a null graph.

After initializing the Weiler graph at step 552, the routine adds two input object paths, the object paths to be intersected, to the graph, at steps 554 and 556. The preferred embodiment uses a standard Weiler implementation to build the graph from the two input object paths. The graph is then simplified at step 560. After simplification, the contours for regions corresponding to an intersection of the two input object paths are returned to the calling routine at step 562. Step 564 returns the routine to the calling routine.

Figure 13:
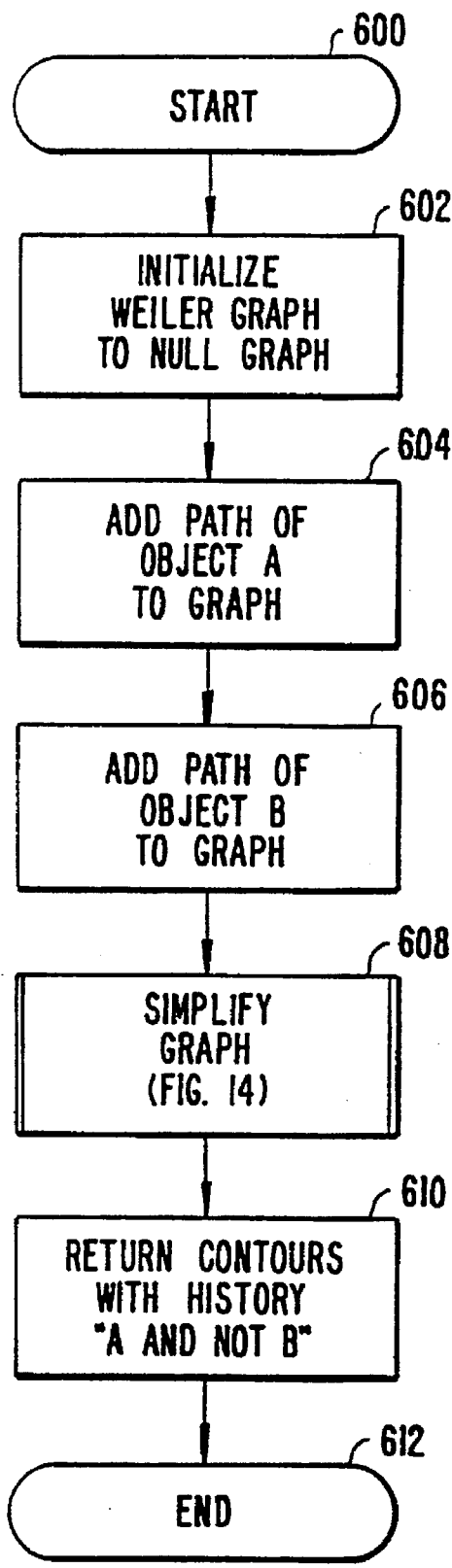
FIG. 13 is a flowchart illustrating operation of a routine, called by SetClippedPrimPath via PunchOutPrim, "ApplyPunchtoPrimsonDl", "prim_intersect_obstruct_func" and "GPSeoclipout", and identified as GPS_path_algebra in difference mode, of the source code of Appendix I.

FIG. 13 is a flowchart illustrating operation of a routine, called by SetClippedPrimPath via PunchOutPrim, "ApplyPunchtoPrimsonDl", "prim_intersect_spread_func" and GPSeoclipout, and identified as GPS_path_algebra in difference mode, of the source code of Appendix I. This routine includes a set of steps called by the steps 462, 470, 472 and 474 of FIG. 10.

Calling the GPS_path_algebra routine in difference mode executes step 600 through step 612. After starting at step 600, the routine initializes a Weiler graph to a null graph at step 602.

After initializing the Weiler graph at step 602, the routine adds two input object paths, the object paths to be determined a set difference, to the graph, at steps 604 and 606. The preferred embodiment uses a standard Weiler implementation to build the graph from the two input object paths. The graph is then simplified at step 608. After simplification, the contours for regions corresponding to a set difference of the two input object paths are returned to the calling routine at step 610. Step 612 returns the routine to the calling routine.

The routines shown in FIG. 12 and in FIG. 13 are similar, differing in the particular type of set operation performed, that is, which contour to return to the calling routine.

Figure 14:
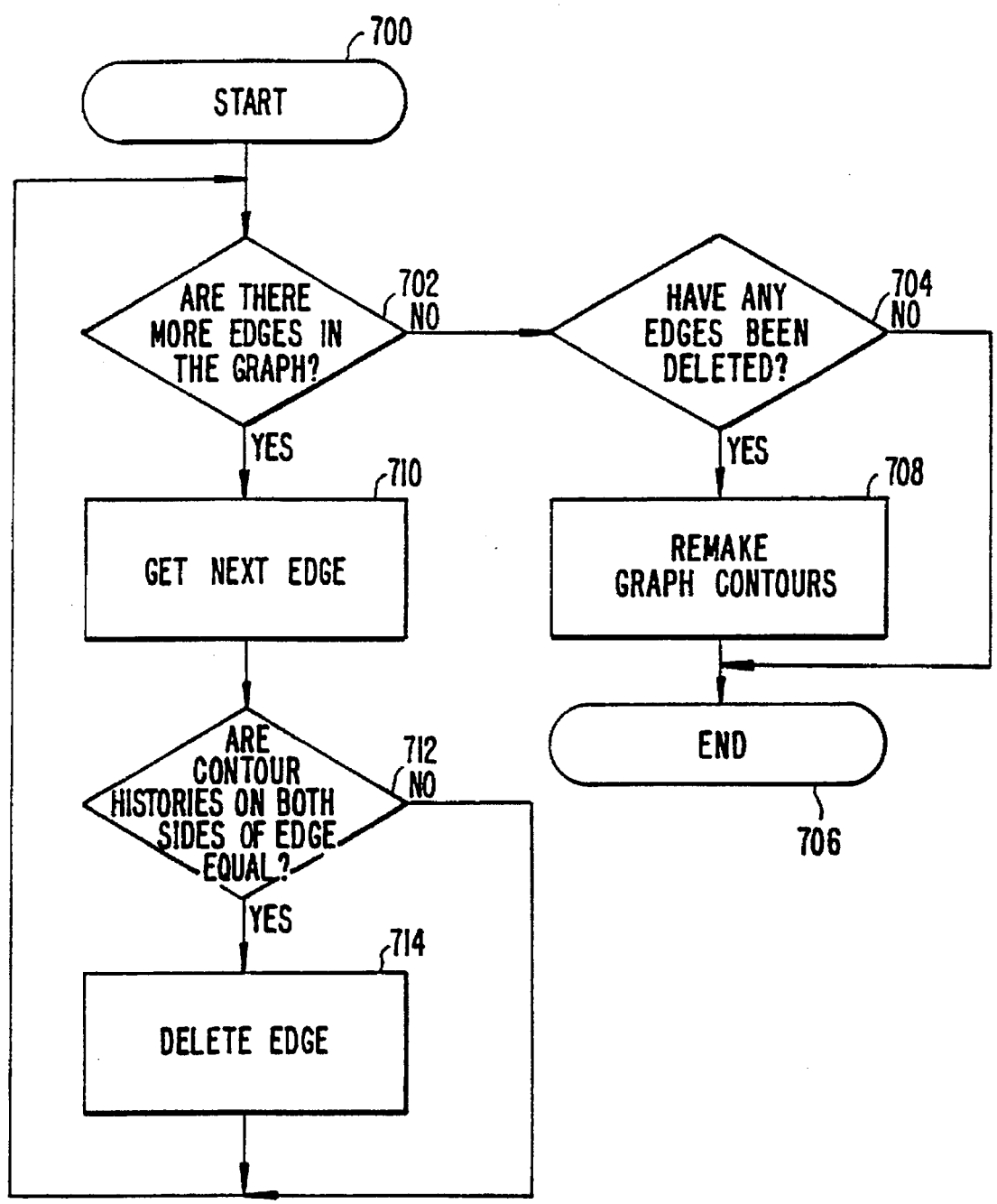
FIG. 14 is a flowchart illustrating operation of a routine, called by GPS_path_algebra via "PathCompGetPath" and identified as "pc_simplify" of the section pcomp.c, of the source code of Appendix I.

FIG. 14 is a flowchart illustrating operation of a routine, called by GPS_path_algebra via "PathCompGetPath" and identified as "pc_simplify" of the section pcomp.c of the source code of Appendix I. This routine includes a set of steps called by the step 560 of FIG. 12 and the step 608 of FIG. 13.

Details of the simplification routine pc_simplify follow. In the C code, an instance of the C structure "graph" represents the planar graph, while an instance of "edge" represents edges of the planar graph. The edge structure includes the first two entries, "succ" and "pred", which implement a doubly-linked list of all edges in the planar graph. The head to this list is the graph structure itself, which is linked in by having a "succ" and a "pred" which are edges.

The simplification routine inspects each edge in the graph by traversing this linked list of edges sequentially. This traversal is implemented by the "for" statement in the routine pc_simplify inside the "else" clause of the first "if" statement. When an edge is inspected, the history, or set of polygons contributing to the region on each side of the edge, are compared. If the histories are equal, the edge does not separate two different types of regions. The edge can be eliminated. The test and edge deletion are implemented in the code by the "if" statement inside the "for" statement, comparing the "hc" members of the contours of each edge for equality, and the following call to "pc_delete_edge" which removes the edge from the graph.

After inspecting all edges, if any edges were deleted, the number and shapes of the regions formed by the graph have changed. This requires rebuilding the contour tree. The rebuilding of the contour tree is a standard Weiler algorithm function and will not be further explained herein. The rebuilding step is important after deleting the non-necessary edges. The routine "pc_make—contours" following a call to pc_simplify remakes the graph contours.

Calling the pc_simplify routine executes step 700 through step 706. After starting at step 700, the routine begins the traversal of the linked list at step 702. Step 702 determines if any edge in the graph remains to be compared. If there are no more edges, the routine determines if any edges were deleted at step 704. If there are no more edges and no edges were deleted, the routine advances to step 706 to return to the calling routine. If one or more edges were deleted, the routine remakes the graph contours at step 708.

In traversing the doubly linked list, that is the determination at step 702 indicates that additional edges exist, the routine gets the next edge at step 710. The routine checks, at step 712, whether contour histories on both sides of the selected edge are equal. If they are not equal, the routine advances to step 702 to determine if any more edges in the list remain to be checked.

However, if at step 712 the histories were equivalent on both sides of the selected edge, the routine deletes the edge from the graph at step 714 and thereafter returns to step 702 to check for more edges.

Conclusion

In conclusion, the present invention offers advantages over prior art systems. The use of set union, intersection and difference for overlapping objects to extract a visible strokable path allows spreading and choking in more situations than in the prior art. The spread table to establish spread incidences and to define a knockout print for the spread having a specified width of a specified color allows flexibility in defining a spread.

While the above is a complete description of the preferred embodiment of the present invention, various alternatives, modifications and equivalents are possible. For example, instead of stroking the visible spread object after clipping to the receiving object, one could (less efficiently) construct a new object from the set intersection of the stroke of the visible spread object and the receiving object, and fill that new object. Also, one could imagine implementing the present invention with a different page description language than PostScript. Therefore, the above description does not limit the scope of the present invention. The appended claims define the scope of the invention.

What is claimed is:

1. A method for spreading a first object into a second object in the presence of an obstructing object that obstructs the first object, wherein a page description language defines the first, second, and obstructing objects with discrete paths which trace outlines of the first, second, and obstructing objects on a page of a display medium, the method comprising the steps of:

defining a temporary object from a portion of the first object that would be visible after rendering the first object, the second object and any obstructing object;

restricting creation of new objects to the interior of the second object; and thereafter creating a third object having the shape of a strip that follows and is centered on an outline of the temporary object.

2. The method of claim 1 wherein said defining step further comprises the steps of:

defining said temporary object equivalent to the first object; and subtracting, said obstructing object from said temporary object.

3. The method of claim 1 wherein said creating step comprises the step of:

stroking said temporary object with a spread color having a spread width.

4. A spreading method, comprising the steps of:

defining a first and second object with a first path which traces the outline of the first object and a second path which traces the outline of the second object on a page of a display of a display medium, said first and second objects each having at least a single zone;

providing said first object with a spread table defining a spread zone, a spread zone color, a receiving zone, a receiving zone color, a spread width, and a spread color for an overlapping portion of said first and second object;

comparing each zone of said first object and each overlapping zone of said second object with said spread table to establish a spread incidence for spreading said spread zone of said first object to a receiving zone of said second object;

restricting creation of new objects to said receiving zone of said second object;

generating a temporary object defined by subtracting an obstructing object lying on top of said spreading zone; and thereafter creating a third object having the shape of a strip that follows and is centered on an outline of the temporary object with said spread color having said spread width.

5. The spreading method of claim 4 wherein said creating step includes the option of Stroking using a knockout color.

6. The spreading method of claim 4 wherein said creating step includes the option of stroking using an overprint color.

7. A method for spreading a first object into a second object in the presence of an obstructing object which obstructs the first object wherein said first, second, and obstructing objects are defined with discrete paths which trace outlines of the first, second and obstructing objects on a page, comprising the steps of:

defining a temporary object from a portion of the first object that would be visible upon a rendering of the first object, the second object and any obstructing object;

restricting creation of new objects to the interior of the second object; and thereafter creating a third object having the shape of a strip that follows and is centered on an outline of the temporary object.

8. The method of claim 7 wherein said creating step comprises the step of:

stroking said temporary object with a spread color having a spread width.

9. The method of claim 7 wherein said creating step comprises the step of:

stroking, using a knockout print option, said temporary object with a spread color having a spread width.

10. The method of claim 7 wherein said creating step comprises the step of:

stroking, using an overprint print option, said temporary object with a spread color having a spread width.

11. A method of stroking only the outermost portion of a border object that includes a plurality of subobjects of which at least two subobjects intersect one another, said method comprising the steps of:

generating a temporary object by obtaining a set union of the plurality of subobjects; and stroking the temporary object.

12. The method of claim 11 wherein said generating step comprises the steps of:

initializing a Weiler graph to be a null graph;

adding paths of the subobjects to the Weiler graph; and simplifying the Weiler graph.

13. A method for spreading a first object into a second object in the presence of an obstructing object that obstructs the first object, wherein a page description language defines the first, second, and obstructing objects with discrete paths which trace outlines of the first, second, and obstructing objects on a page of a display medium, the method comprising the steps of:

defining a temporary object from a portion of the first object that would be visible after rendering the first object, the second object and any obstructing object;

creating a third object that includes a spreading edge between said temporary object and said second object.

14. The method of claim 13 wherein said defining step further comprises the steps of:

defining said temporary object equivalent to the first object; and subtracting said obstructing object from said temporary object.

15. The method of claim 13 wherein said creating step comprises the steps of:

restricting creation of new objects to the interior of the second object; and thereafter creating a fourth object having the shape of a strip that follows and is centered on an outline of the temporary object.

16. The method of claim 15 wherein said step of creating the third object comprises the step of:

stroking said temporary object with a spread color having a spread width.

17. A method for spreading a first object into a second object in the presence of any obstructing objects wherein a page description language defines the first, second, and obstructing objects, said method comprising the steps of:

applying one or more page description language operators to identify a visible boundary between said first and second objects in the presence of any obstructing objects; and storing page description language information specifying a strip to be rendered that follows said visible boundary.

18. The method of claim 17 wherein said storing step comprises stroking said visible boundary.

19. A method for spreading a first object into a second object wherein a page description language defines the first and second objects, said method comprising the steps of:

applying one or more page description language operators to at least one of said first and second objects to obtain information identifying a visible boundary between said first and second objects; and storing page description language information specifying a strip to be rendered that follows said visible boundary responsive to said visible boundary identifying information.

20. The method of claim 19 wherein said visible boundary identifying information comprises a visible boundary path description in said page description language.

21. The method of claim 19 wherein said storing step comprises stroking said visible boundary.

* * * * *